(12) United States Patent
Gaiti

(10) Patent No.: US 8,161,964 B2
(45) Date of Patent: Apr. 24, 2012

(54) DIRECT ACCUMULATION TANK FOR HEATING WATER WITH SOLAR ENERGY

(75) Inventor: Giorgio Gaiti, Correggio (IT)

(73) Assignee: G.F. S.R.L., Correggio (IT)

( * ) Notice: Subject to any disclaimer, the term of this patent is extended or adjusted under 35 U.S.C. 154(b) by 432 days.

(21) Appl. No.: 12/516,780

(22) PCT Filed: Dec. 10, 2007

(86) PCT No.: PCT/IB2007/003921
§ 371 (c)(1),
(2), (4) Date: May 28, 2009

(87) PCT Pub. No.: WO2008/072076
PCT Pub. Date: Jun. 19, 2008

(65) Prior Publication Data
US 2010/0071685 A1    Mar. 25, 2010

(30) Foreign Application Priority Data
Dec. 12, 2006  (IT) .............................. RE2006A0149

(51) Int. Cl.
*F24J 2/24* (2006.01)
(52) U.S. Cl. .................... 126/656; 126/561; 126/623
(58) Field of Classification Search .......... 126/561–568, 126/623, 656
See application file for complete search history.

(56) References Cited

U.S. PATENT DOCUMENTS

| | | | | |
|---|---|---|---|---|
| 1,747,826 A * | 2/1930 | Gould | ........................... | 126/651 |
| 2,277,921 A * | 3/1942 | McCullough et al. | ........ | 165/130 |
| 2,399,357 A * | 4/1946 | Koper | ........................... | 165/176 |
| 3,299,881 A * | 1/1967 | Koch | ............................ | 126/563 |
| 3,616,849 A * | 11/1971 | Dijt | ................................ | 165/125 |
| 3,939,819 A * | 2/1976 | Minardi | ........................ | 126/678 |
| 4,007,728 A * | 2/1977 | Guba | ............................ | 126/667 |
| 4,014,314 A * | 3/1977 | Newton | ........................ | 126/626 |
| 4,036,208 A * | 7/1977 | Bauer | ............................ | 126/658 |
| 4,138,997 A * | 2/1979 | LaPorte et al. | ................ | 126/658 |
| 4,144,874 A * | 3/1979 | Zebuhr | ......................... | 126/664 |
| 4,149,525 A * | 4/1979 | Prado | ............................ | 126/654 |
| 4,192,287 A * | 3/1980 | James | ........................... | 126/675 |
| 4,197,830 A * | 4/1980 | Wilson | ......................... | 126/620 |
| 4,204,522 A * | 5/1980 | Wilson | ......................... | 126/660 |
| 4,206,746 A * | 6/1980 | Chubb | .......................... | 126/651 |

(Continued)

FOREIGN PATENT DOCUMENTS

DE  3029680 A1  2/1982

(Continued)

*Primary Examiner* — Kenneth Rinehart
*Assistant Examiner* — Jorge Pereiro
(74) *Attorney, Agent, or Firm* — Pearne & Gordon LLP

(57) ABSTRACT

A direct accumulation tank, defining a closed volume (2), comprising an inlet (3) for filling the tank with a fluid, and an outlet (4) for emptying the tank of the fluid, and exhibiting an upper surface (Ia) exposed to solar rays. The upper surface (Ia) exhibits a plurality of reliefs (5, . . . 5n) for defining a greater surface extension exposed to the solar rays.

18 Claims, 2 Drawing Sheets

U.S. PATENT DOCUMENTS

| | | | | |
|---|---|---|---|---|
| 4,286,580 A | * | 9/1981 | Sitnam | 126/657 |
| 4,291,681 A | * | 9/1981 | Berringer | 126/673 |
| 4,361,136 A | * | 11/1982 | Huang | 126/656 |
| 4,407,270 A | * | 10/1983 | Riedel | 126/675 |
| 4,676,227 A | * | 6/1987 | Walters | 126/713 |
| 5,509,246 A | * | 4/1996 | Roddy | 52/533 |
| 5,660,164 A | | 8/1997 | Rodriguez | |
| 7,870,855 B2 | * | 1/2011 | Flaherty | 126/651 |
| 2008/0256700 A1 | * | 10/2008 | Gaiti | 4/598 |
| 2010/0282240 A1 | * | 11/2010 | Hare | 126/565 |

FOREIGN PATENT DOCUMENTS

| | | | |
|---|---|---|---|
| DE | 3214765 A1 | | 11/1983 |
| DE | 3819243 A1 | | 12/1989 |
| DE | 29901377 U1 | | 4/1999 |
| EP | 0655588 A | | 5/1995 |
| EP | 1142523 A | | 10/2001 |
| FR | 2699991 A | | 7/1994 |
| GB | 1328372 A | | 8/1973 |
| WO | WO 8302659 A | * | 8/1983 |
| WO | 2007054766 A | | 5/2007 |

* cited by examiner

DIRECT ACCUMULATION TANK FOR HEATING WATER WITH SOLAR ENERGY

TECHNICAL FIELD

The invention relates to a direct accumulation tank for heating water using solar energy.

The device is applicable in the field of renewable energy sources, and in particular in the sector of production of hot water by exploitation of solar energy.

BACKGROUND ART

The prior art comprises direct accumulation systems and circulation systems, the latter being further sub-dividable into natural circulation systems and forced circulation systems.

While the latter systems are structurally more complex, more expensive and require a laborious and costly installation involving masonry work, direct accumulation tanks are more economical and easy to install, being substantially defined by a tank which functions as a heat absorbing element. Accumulation tanks exhibit an inlet and an outlet for the water which are is connected to a small-volume and flat or squeezed-configuration tank (in order to increase the surface-volume ratio) superiorly provided with a glass or plastic covering.

These devices, which require locating in a position which is directly exposed to the sun's rays, have a mean performance which is considerably below that of circulation systems.

Their use is preferred in occasionally-used dwellings, such as for example holiday homes, camp sites and mountain refuges, where consumption of hot water is of modest entity and where easy dismounting for winter storage is required.

The prior-art devices exhibit the drawback of lower overall performance than their competitors among the other systems.

The heating of the volume of water contained in the tank is, in reality, "layered", where the upper layers are hot (i.e. the layers more directly in contact with the surface exposed to the solar rays) and where the lower layers are less hot, as they are further from the surface exposed to the solar rays.

It is also possible that a kind of short circuit can establish itself in the above-described accumulation tanks, i.e. a sort of by-pass, in which the incoming water tends to flow directly towards the outlet conduit without stopping internally of the tank to absorb the sun's heat.

A partial solution to the above problem can be applied by drastically reducing the height of the tank.

This design choice, however, penalises the capacity of the tank on the one hand, and on the other reduces the overall size of the surface thereof.

A further disadvantage is the considerable delicacy of the tanks.

To improve heat exchange between the surface exposed to the sun's rays and the volume of water contained in the tank, it is preferable to construct the surface to be exposed to the solar rays with a smaller thickness.

This design choice causes a smaller resistance to impacts which can occur both during transport of the tanks and during exposure thereof to climatic events such as, for example, rain or hail.

The aim of the present invention is to provide a tank with is easily installed and which has highly robust qualities.

A further aim of the present invention is to provide a tank which delivers a better performance than usual tanks present on the market, on a like-for-like basis.

A further aim of the present invention is to provide a tank which internally exhibits a small temperature gradient.

These aims and advantages and more besides are all attained by the invention as it is characterised in the appended claims.

DISCLOSURE OF INVENTION

Further characteristics and advantages of the present invention will better emerge from the detailed description that follows of an embodiment of the invention, illustrated by way of non-limiting example in the accompanying figures of the drawings.

Figures 1, 4:
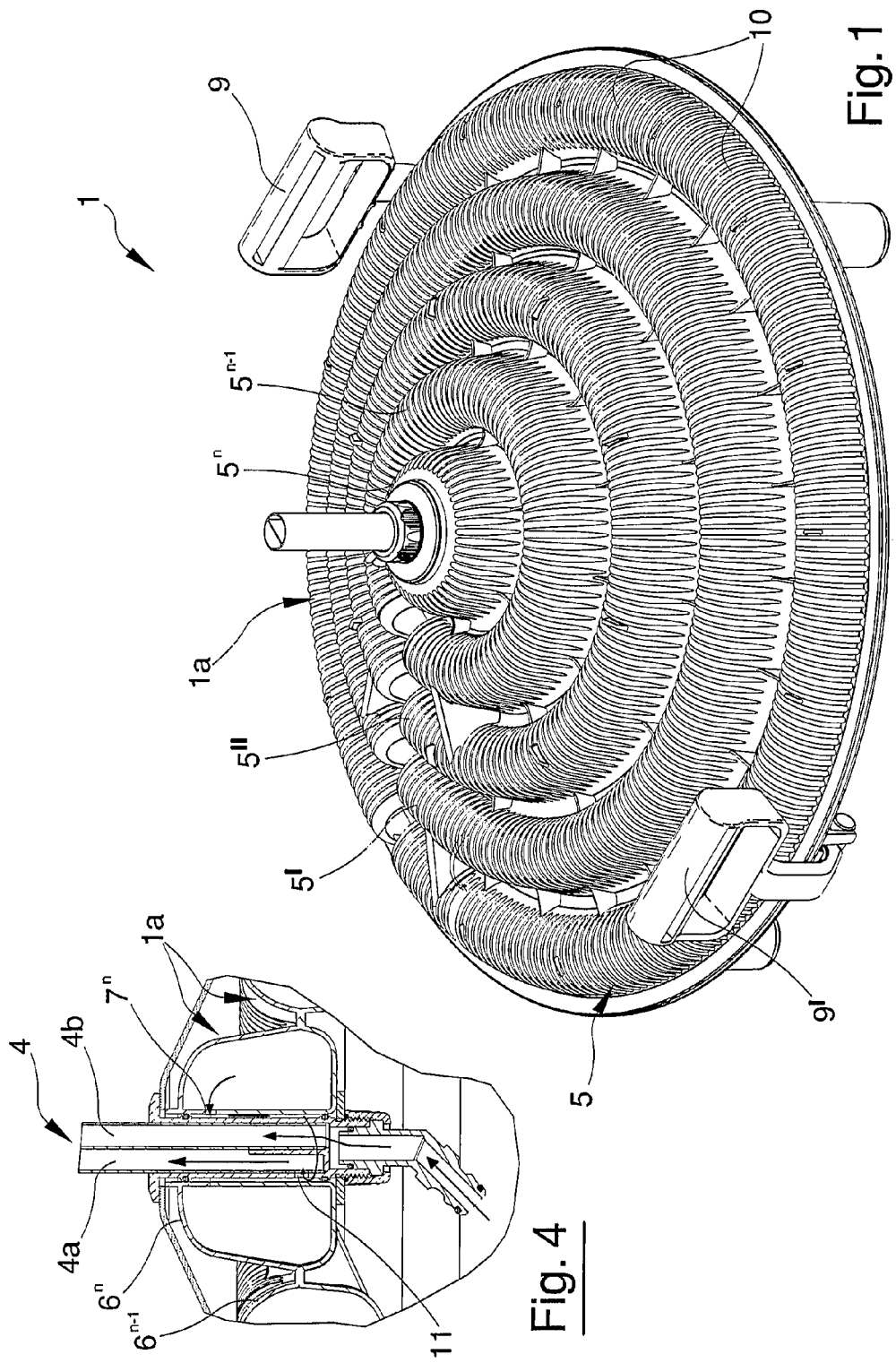
FIG. 1 illustrates a perspective view of the direct accumulation tank of the present invention.
FIG. 4 is a detailed view of an upper portion of the tank illustrated in FIG. 3.

With reference to the accompanying figures of the drawings, 1 denotes in its entirety a tank of the direct accumulation type.

The tank 1 includes a closed volume 2 containing a fluid, water, which is heatable by exposing an upper surface 1$a$ thereof to solar rays.

The tank 1 is supplied by means of an inlet 3 and is emptied, or partially emptied, by means of an outlet 4.

The inlet 3 and the outlet 4 are in reciprocal hydraulic communication via a plurality of conduits 6, . . . 6'', which delimits the closed volume 2 of the tank 1.

The plurality of conduits 6, . . . 6'', is hydraulically located in series.

The plurality of conduits 6, . . . 6'', is defined by a first conduit 6, connected to the inlet 3 via a first opening 7, a final conduit 6'', connected to the outlet 4 via a final opening 7'', and a series of intermediate conduits 6' . . . 6''$^{n-1}$, each contiguous and hydraulically connected to a preceding conduit and a successive conduit via a respective intermediate opening 7' . . . 7''$^{n-1}$.

As can be seen in the accompanying figures, the first conduit 6 is the base conduit, connected to the inlet 3, and the final conduit 6'' is the conduit located at the top of the tank 1 and connected to the outlet 4, and the intermediate conduits 6' . . . 6''$^{n-1}$, are interposed between the first conduit 6 and the final conduit 6''.

In the specific example the initial conduit 6 is in hydraulic communication upstream with the inlet 3, via the opening 7, and downstream with a second conduit 6', belonging to the series of conduits 6' . . . 6''$^{n-1}$, via the opening 7'.

The second conduit 6', in turn, is in hydraulic communication, via an intermediate opening 7'', with a third conduit 6'' which is also part of the series of conduits 6, . . . 6''.

The final conduit 6'' is in hydraulic communication upstream with the penultimate conduit 6''$^{n-1}$, the series of conduits 6', . . . 6''$^{n-1}$, by means of the final opening 7$n$-1 and downstream with the outlet 4.

The series including the first opening 7, final opening 7'', and series of intermediate openings 7, . . . 7'', is arranged alternatedly with a separator wall 8 crossing the plurality of conduits 6, . . . 6''.

Figure 2:
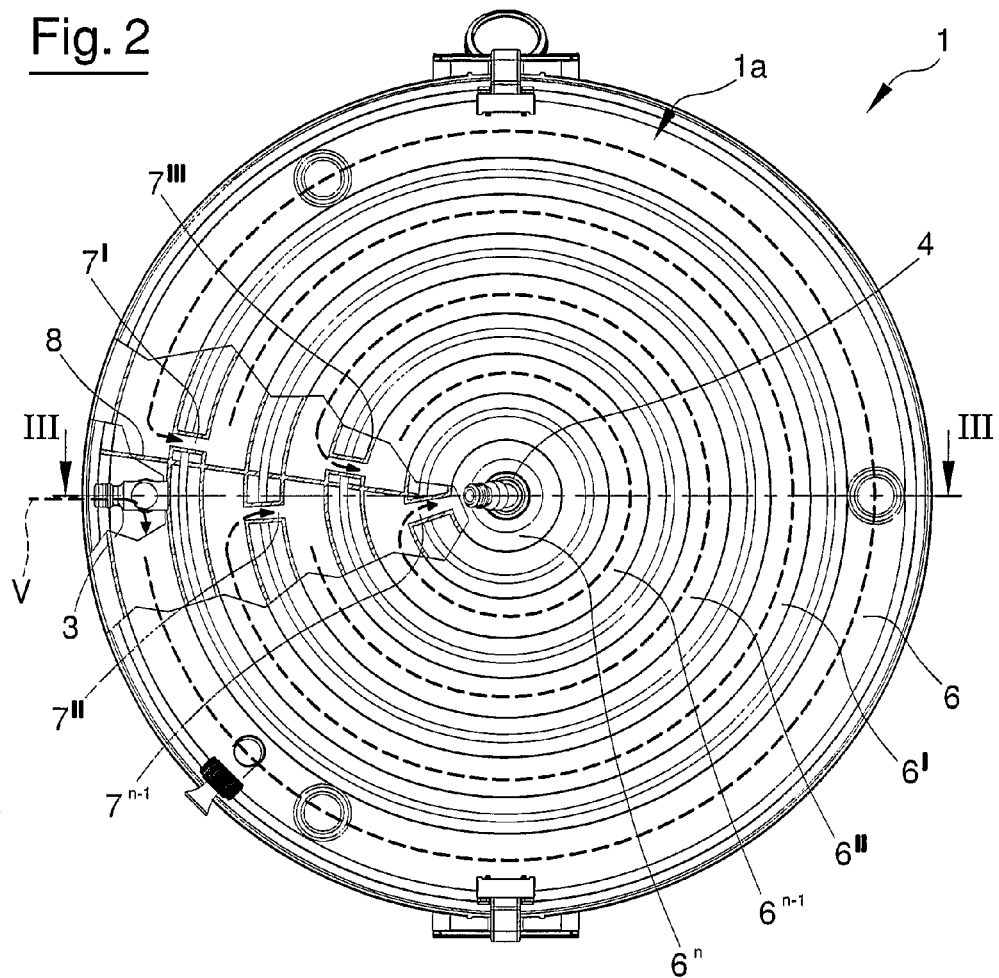
FIG. 2 is a plan view of the device of FIG. 1.

In this way the various openings facilitate, in collaboration with the separator wall 8, a water circulation, from the inlet 3 to the outlet 4, with a spiral progression in an alternated concentric direction as denoted in FIG. 2 by the letter V.

In this way the water performs a forced passage, first in an anticlockwise direction on a first conduit 6, then in a clockwise direction on a second conduit 6', in hydraulic communication with the preceding, and newly following the same alternated sequence up to reaching the final conduit 6" located on the top of the tank 1.

The geometric conformation of the plurality of conduits 6, ... 6" is preferably symmetrical, each conduit being concentric to a contiguous conduit.

In the preferred embodiment, illustrated in the accompanying figures of the drawings, each conduit of the plurality 6, ... 6" exhibits a circular is progression with a decreasing radius, starting from the first conduit 6 up to the final conduit 6".

In a further preferred conformation, each conduit belonging to the plurality 6, ... 6" exhibits a polygonal progress, with a decreasing radius starting from the first conduit 6 up to the final conduit 6".

The upper surface 1a of the tank 1 is defined by a plurality of reliefs 5, ... 5" which enables obtaining a greater surface extension exposed to the solar rays with respect to the usual substantially planar surfaces of the traditional accumulation tanks.

The plurality of reliefs 5, ... 5" is covered by a cover 12, having a substantially truncoconical shape, of translucent plastic material defining, with the plurality of reliefs 5, ... 5", an air chamber which causes an effect known as the "greenhouse effect".

The translucent cover 12 also has the objective of providing a mechanical defence of the tank, and further facilitates cleaning-away of encrustation, powder or other substances covering the exposed surface.

Each conduit 6, ... 6" defines the respective relief of the reliefs 5, ... 5", though the convex upper portion thereof.

For example, in a case in which the conduit has a curved transversal section, defined by an upper curved segment joined to a lower curved segment, each upper curved segment defines a relief of the plurality 5, ... 5".

Each polygonal edge or each closed curved edge (illustrated in the figures) has the above-cited function, i.e. the definition of reliefs constituting the upper surface 1a of the tank 1.

Figure 3:
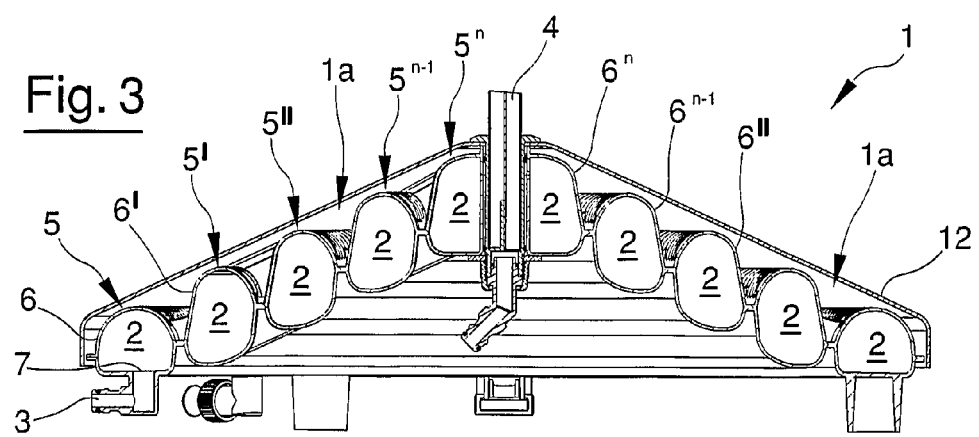
FIG. 3 is a front view of a diameter section of the device of FIG. 2 according to line

As can be seen in FIG. 3, each conduit belonging to the plurality 6, ... 6" is raised with respect to a contiguous and external conduit.

More precisely, an upper curved segment belonging to a conduit, for example belonging to the conduit 6', is raised with respect to the upper curved segment of the corresponding contiguous and external conduit, which in the example is the first conduit 6.

In this way, when the solar rays are not perpendicularly incident on the upper surface, the perpendicular incidence being a situation which occurs only in the first hours of the afternoon, there is all the same an optimisation of the surface struck by the rays.

Thanks to this design choice, in a case in which the solar rays strike the upper surface 1a with an inclined direction, the top of the convex upper portion of a conduit does not place the base of the convex upper portion of a respective contiguous conduit and internal of the preceding conduit in the shade.

Each conduit of the plurality 6, ... 6" superiorly exhibits, at each relief of the plurality of reliefs 5, ... 5", a corrugated progression, defined by a plurality of ribs 10.

Each rib 10 belonging to the plurality of ribs 10 is arranged transversally of the development of each conduit, and preferably has a radial arrangement, in order to further facilitate a greater surface extension of a normal circular surface.

As can be seen in the figures of the drawings, the outlet 4 is arranged transversally of the inlet 3.

While the inlet 3 is arranged almost tangentially of the first conduit 6, the outlet 4 is perpendicularly incident to the tank 1 and in communication with the final conduit 6".

The outlet 4 is then, at the lower tract thereof, subdivided into a first chamber 4a and a second chamber 4b.

The first chamber 4a is in hydraulic communication with the final conduit 6" through a hole 11 communicating with the final opening 7".

The second chamber 4b crosses the final conduit 6", and consequently the tank 1, in order possibly to be connected to a further source for direct supply of cold water.

The tank 1 can comprise, at the first tract 6 thereof, a safety valve 18 for safeguarding the integrity of the tank 1 from pressure peaks.

Further, the first tract 6 can be provided with a pair of handles 9, 9' for facilitating the displacements of the tank 1.

The structural and geometric conformation of the tank 1 exhibits various advantages.

Firstly, the sub-division of the closed volume 2 of the tank 1 into a plurality of conduits enables a smaller temperature gradient of the fluid contained in the tank 1 to be obtained.

Further, the conformation of the upper surface 1a, exposed to the solar rays, enables an increase of the surface area struck.

The presence of ribs further improves the surface area struck by the sun's rays, apart from giving the tank further characteristics of sturdiness.

The raised positioning of each conduit further facilitates absorption of the solar rays during the range of the whole day.

The invention claimed is:

1. A direct accumulation tank, defining a closed volume (2), comprising an inlet (3) for filling the tank with a fluid, and an outlet (4) for emptying the tank of the fluid, and exhibiting an upper surface (1a) exposed to solar rays; the upper surface (1a) exhibiting a plurality of reliefs (5, ... 5") for defining a greater surface extension exposed to the solar rays; the outlet (4) exhibiting a transversal orientation with respect to the inlet (3); the outlet (4), at a lower tract thereof, being subdivided into a first chamber (4a) and a second chamber (4b).

2. The direct accumulation tank of claim 1, wherein the first chamber (4a) is in hydraulic communication with a final conduit (6").

3. The direct accumulation tank of claim 1, wherein the second chamber (4b) can be connected to a supply source for direct sourcing of cold water.

4. A direct accumulation tank, defining a closed volume (2), comprising an inlet (3) for filling the tank with a fluid, and an outlet (4) for emptying the tank of the fluid, and exhibiting an upper surface (1a) exposed to solar rays; wherein the upper surface (1a) exhibits a plurality of reliefs (5, ... 5") for defining a greater surface extension exposed to the solar rays; the inlet (3) and the outlet (4) being in reciprocal hydraulic communication via a plurality of conduits (6 ... 6"), reciprocally connected in series and defining the closed volume (2) of the tank (1); wherein the plurality of conduits (6, ... 6") comprises:

a first conduit (6) in hydraulic communication with the inlet (3) via a first opening (7); a final conduit (6"), in hydraulic communication with the outlet (4) via a final opening (7"); a series of intermediate conduits (6', ... 6$^{n-1}$), each contiguous and in hydraulic communication with a preceding and a successive intermediate conduit (6', ... 6$^{n-1}$) via a respective intermediate opening (7, ... 7$^{n-1}$), and wherein the first opening, the final opening and the intermediate openings (7, ... 7") are alternatedly arranged with respect to a separating wall (8) crossing the plurality of conduits (6, ... 6").

5. The direct accumulation tank of claim 4, wherein each conduct of the plurality of conduits (6, . . . 6″) exhibits a convex upper portion defining the respective relief belonging to the plurality of reliefs (5, . . . 5″).

6. The direct accumulation tank of claim 5, wherein each conduit belonging to the plurality of conduits (6, . . . 6″) superiorly exhibits, at the relief (5, . . . 5″) thereof, a corrugated progression defined by a plurality of ribs (10) having a radial arrangement.

7. The direct accumulation tank of claim 4, wherein each conduit of the plurality of conduits (6, . . . 6″) is concentric to a contiguous conduit of the plurality of conduits (6, . . . 6″).

8. The direct accumulation tank of claim 7, wherein each conduit of the plurality of conduits (6, . . . 6″) exhibits a circular progression, with a decreasing radius starting from the first conduit (6) and going up to the final conduit (6″).

9. The direct accumulation tank of claim 7, wherein each conduit of the plurality of conduits (6, . . . 6″) exhibits a polygonal progression, with a decreasing radius starting from the first conduit (6) and going up to the final conduit (6″).

10. The direct accumulation tank of claim 7, wherein each conduit of the plurality of conduits (6, . . . 6″) is raised with respect to a respective contiguous and external conduit.

11. The direct accumulation tank of claim 4, wherein the first opening, the final opening and the intermediate openings (7, . . . 7″) facilitate, in collaboration with the separating wall (8), a circulation of the water, from the inlet (3) to the outlet (4), with a spiral progress in concentric alternating directions.

12. The direct accumulation tank of claim 4, wherein the outlet (4) exhibits a transversal orientation with respect to the inlet (3).

13. The direct accumulation tank of claim 12, wherein the outlet (4), at a lower tract thereof, is subdivided into a first chamber (4a) and a second chamber (4b).

14. The direct accumulation tank of claim 13, wherein the second chamber (4b) can be connected to a supply source for direct sourcing of cold water.

15. The direct accumulation tank of claim 12, wherein a first chamber (4a) is in hydraulic communication with a final conduit (6″).

16. The direct accumulation tank of claim 4, wherein the first conduit (6) exhibits, in a lower region thereof, a safety valve (18) in order to safeguard integrity of the first conduit (6) during pressure peaks.

17. The direct accumulation tank of claim 4, wherein the first conduit (6) can be provided with a pair of handles (9, 9') to facilitate displacements of the tank (1).

18. The direct accumulation tank of claim 4, wherein the plurality of reliefs (5, . . . 5″) is covered by a cover (12) made of a translucent plastic material.

\* \* \* \* \*